Oct. 20, 1931.    G. SPATTA    1,828,155
METHOD OF MAKING WHEELS
Filed May 28, 1928
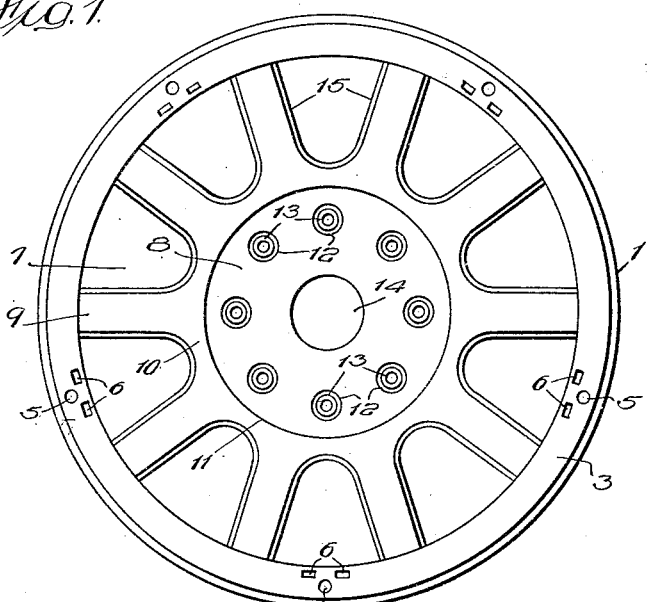
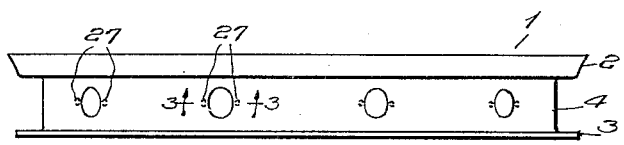
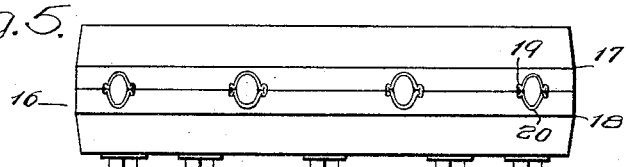
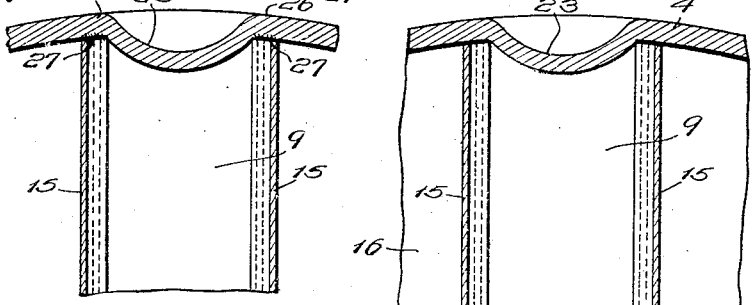
Witness:
William P. Kilroy
Inventor:
George Spatta
By
Attys Patented Oct. 20, 1931

1,828,155

UNITED STATES PATENT OFFICE

GEORGE SPATTA, OF BUCHANAN, MICHIGAN, ASSIGNOR TO CLARK EQUIPMENT COMPANY, OF BUCHANAN, MICHIGAN, A CORPORATION OF MICHIGAN

METHOD OF MAKING WHEELS

Application filed May 28, 1928. Serial No. 280,978.

My invention relates to metal wheels and method of making the same.

The manufacture of a wheel of this type is disclosed in my copending application, Serial No. 280,981, filed of even date herewith. The present application is directed more particularly to the manner of uniting the spider and rim at the spoke ends. The spider is fabricated out of sheet metal halves joined together preferably by a lock seam, which lock seam adds considerable strength to the individual spokes for supporting load in column effect. Depending upon the duty to which the wheel is put, the spider may support the load solely by the column strength of the spokes, or if desired, the ends of the spokes may be secured as by welding to the web of the rim or felloe to secure a suspended hub effect together with the column supporting effect at the spokes.

Since the metal which is employed must have for mechanical reasons a certain minimum thickness, an inherent strength resides in the spider because of said minimum thickness of the sheet metal, and where this inherent strength is great enough the ends of the spokes need not be welded to the rim but should be secured nevertheless in such a manner as to prevent mechanical displacement of the spider with respect to the rim or felloe. For this interlocking of the rim and spokes I arrange to depress the web of the rim or felloe into the open end of the spokes while supporting the ends of the spoke against overload. That is to say, the amount of force required to form the depression is greater than the strength of the spoke but by suitably supporting the spoke end against failure or yielding the depression may be formed.

Now in order to acquaint those skilled in the art with the manner of constructing a wheel according to the present invention I shall describe in connection with the accompanying drawings a specific embodiment of the same. In the drawings Fig. 1 is a side view of a wheel constructed in accordance with the present invention.

Fig. 2 is a top or edge view of the same.

Fig. 3 is a fragmentary sectional view showing the end of the spokes and the web of the rim with the depression formed in the web of the rim.

Fig. 4 is a view similar to Fig. 3, showing the end of the spokes spot-welded to the web of the rim; and Fig. 5 is an edge view of the supporting rim or clamp by which the spoke ends are supported both for forcing the spider into the rim and for forming the depressions in the web of the spoke.

The wheel shown in Fig. 1 comprises a rim or felloe 1 having tapered flanges 2 and 3, and a web portion 4 lying between them. This rim is a rolled metal continuous rim which may be bought on the open market formed true to shape and punched for bolts, as indicated at 5, and for receiving lugs as indicated at 6. The spider 7 is made up of two drawn sheet metal blank punchings, each providing a central circular disk 8 which forms the side of the hub extending beyond the outer plane of the spokes 9 and the web portion 10 which joins the spokes, a shoulder 11 being formed at the junction of the disk 8 and web 10 so as to provide a thickness of hub of the desired dimension. The hub disk 8 has depressions 12 in which are seated the heads 13 of hollow shouldered rivets or posts, which space the two hub parts 8 of the respective blanks or stampings and hold them securely together. Bolts for supporting the wheel on a suitable hub and bearing structure pass through the openings in the hollow rivets. The central part of each of the disks 8 has an inwardly drawn tubular flange for forming the central hub opening 14.

The margins of the blanks are provided with flanges which are curved in opposite directions and then joined by locking strip channels 15 of substantially U shape which are swaged or rolled into tight engagement to form lock seams along the meeting edges of the blanks at the sides of the spokes and along the margins of the webs. The spider 7 is formed to the proper size slightly larger in diameter than the internal diameter of the rim or felloe 1 and then by means of the clamp 16 shown in Fig. 5 the spider is rigidly supported in the clamp while the spider is introduced into the rim or felloe 1.

This is preferably done by pressing in a hydraulic press the spider with the clamping ring 16 secured thereupon into the rim 1. The clamping ring 16 embraces only the outer part of the spokes, these spokes being preferably of a cylindrical configuration with the exception of the locking seams along the sides. The clamping ring 16 comprises two ring members 17 and 18 having suitably formed radial openings at their meeting edges, as indicated at 19 and 20, to receive the individual spoke and clamp the same firmly. A series of bolts or cap screws 21—21 is employed to clamp the two rings 17, 18 together upon the spoke ends so as to form with the spider a rigid construction.

In lieu of forcing the spider with the clamping ring 16 into the felloe by mechanical pressure the rim or felloe may be heated to expand the same to permit introduction of the spider into the rim. After such introduction of the spider into the rim under pressure the rim 1 is in a stretched condition and the spider 7 is compressed so that the two parts are mechanically bound together.

The diameter of the clamping ring 16 is substantially equal to or slightly less than the diameter of the spider, and the face 22 of the clamp 16 between the openings for the spokes may be recessed and the sides of the rings 17, 18 chamfered off as indicated in Fig. 5 so that substantially only the surfaces surrounding the openings 19, 20 remain flush with the ends of the spokes.

While the clamping ring 16 is still in place on the spider the assembled wheel is next placed in a press where the inner part of the clamping ring 16 is supported, and by a punch applied against the web 4 over the end of the spoke a depression 23 is formed in the metal of the web 4, said depression extending into the interior of the spoke 9 shown in Fig. 3. The force required to form the depression 23 in the web 4 is greater than the individual spoke 9 will sustain alone, and it is here that the clamping ring 16 serves its dual purpose of supporting the end of the spoke against the radial pressure which would otherwise be applied by forming a depression 23 in addition to its initial function of supporting the spokes against collapse during sidewise pressure of the spider into the rim.

There is also a tendency in forming the depression 23 to split the end of the spoke, but this is supported by the close fit of the clamping ring 16 about the end of the spoke so as to give at this point the desired hoop strength to permit such depression to be formed.

The clamping ring may now be removed and the wheel employed as thus far constructed is so desired. The operation of forming the depression 23 in the spoke ends has contracted to some extent the web 4 and caused it permanently to embrace the spider 7, even though the lateral forcing of the spider into the rim 1 may not have required much pressure. That is to say, the completed form of the wheel at this point provides an interstressed structure, the rim being in tension and the spider in compression so that for any load applied to the hub the entire lower half of the wheel at any particular instant is active to support the load.

Where greater strength is required the welding operation now to be described may be employed so that the upper part of the wheel may be in tension at the same time that the lower part of the wheel is in compression. For this operation of welding, the end of the spoke is suitably clamped and supported, and an electrode is applied at the points 26, 26 to form a spot weld at 27, 27 where the lock seamed part of the spoke end bears against the web. The mass of metal in the lock seam is great enough to permit of this weld with the web 4.

The formation of the depression 23 may be omitted in view of the weld 27 at the lock seam. This weld performs the dual function of permitting joining of the web 4 and the end of the spoke 9 and of welding together the end of the lock seam so as to give the end of the spoke the required hoop strength to prevent opening of the lock seam. It is desirable to have a close press fit between the rim and the spider so that the weld 27 is not subjected to any appreciable amount of flexing, which would tend eventually to break the same. The clamping ring 16 is shown in a fragmentary section in Fig. 3 as applied to the end of the spoke 9, and it has the inner surface 28 which may have suitable configuration for engaging the supporting means to support the ring during the operation of pressing the depression 23. Any suitable means for supporting the ring during the pressing operation may be employed, and shoulders on opposite sides may be employed instead of the inner peripheral surface which provides the shoulder as indicated in Fig. 3.

The sheet metal of which the stampings for the two halves of the spider are made are in one form of my invention of approximately fifty-thousandths of an inch in thickness, and the thickness of the lock seam strips 15 is substantially the same or may be slightly thicker. The amount of depression of the web 4 at the depressions 23 leaves no sharp shoulders, and hence the rim, if it is a drop center rim (and this is contemplated within my invention) may apply the tire directly to the same without injury from such depressions 23.

I do not intend to be limited to the specific construction and mode of manufacture herein described except as the same is referred to in the appended claims.

I claim:

1. The method of connecting a hollow sheet metal spoked spider with a channel shaped rim which comprises clamping the ends of the spokes in a rigid clamp, forcing the clamp and the spider as a whole unit into the rim to tension the rim onto the spider, supporting the rim adjacent a spoke, and pressing the web of the rim into the open end of the spoke.

2. The method of connecting a hollow sheet metal spoked spider with a channel shaped rim which comprises supporting the ends of the spokes in a rigid clamp substantially flush with the ends of the spokes, forcing the clamp and the spider as a whole unit into the rim to tension the rim onto the spider, supporting the rim adjacent a spoke depressing the web of the rim into the open end of the spoke, and welding the end of the spoke to the rim.

3. The method of making a wheel which comprises forming an endless circular rim of outwardly facing channel section, forming a spider comprising hub and spoke portions of complementary sheet metal stampings, uniting the edges of the stampings along the spokes and hub portion by lock seams, forcing the spider laterally into the rim to tension the rim onto the spider, supporting the end of a spoke by jaws gripping the end of the spoke from the sides thereof, and pressing the web of the channel into the open end of the spoke while the spoke is supported by said clamping jaws.

4. The method of making a wheel which comprises forming an endless circular rim of outwardly facing channel section, forming a spider comprising hub and spoke portions of complementary sheet metal stampings, uniting the edges of the stampings along the spokes and hub portion by lock seams, forcing the spider laterally into the rim to tension the rim onto the spider, supporting the end of a spoke by jaws gripping the end of the spoke from the sides thereof, pressing the web of the channel into the open end of the spoke while the spoke is supported by said clamping jaws, and then welding the web of the channel to the lock seamed portions of the spoke.

In witness whereof I hereunto subscribe my name this 23rd day of May, 1928.

GEORGE SPATTA.